United States Patent

Bak et al.

[15] 3,688,188

[45] Aug. 29, 1972

[54] MEANS FOR MEASURING THE DENSITY OF FLUID IN A CONDUIT

[72] Inventors: Aloysius Bak, Davenport; Roy E. Resh, Bettendorf, both of Iowa

[73] Assignee: The Bendix Corporation

[22] Filed: Dec. 21, 1970

[21] Appl. No.: 99,815

[52] U.S. Cl. ....................................324/58.5 C
[51] Int. Cl. ............................................G01r 27/04
[58] Field of Search ..........................324/58, 58.5 C

[56] References Cited

UNITED STATES PATENTS

| | | | |
|---|---|---|---|
| 2,548,598 | 4/1951 | Feiker, Jr. | 324/58.5 C |
| 3,541,434 | 11/1970 | Mullen | 324/58 C |
| 3,238,452 | 3/1966 | Schmitt et al. | 324/61 |
| 2,792,548 | 5/1957 | Hershberger | 324/58.5 C |
| 3,456,185 | 7/1969 | Akao et al. | 324/58.5 C |

FOREIGN PATENTS OR APPLICATIONS

| | | | |
|---|---|---|---|
| 51,994 | 9/1966 | Poland | 324/58.5 |

Primary Examiner—Robert J. Corcoran
Attorney—William N. Antonis and Plante, Hartz, Smith & Thompson

[57] ABSTRACT

A system using a resonant cavity sensor for determining density of a fluid within a conduit. The system includes a resonant cavity encircling a low loss portion of the conduit through which the fluid may flow. The cavity of the sensor is resonated by a source of microwave power. As the resonant frequency of the sensor is changed due to changing densities of the fluid, the frequency of the source is also changed to maintain a resonant condition. A reference generator output of a predetermined frequency is mixed with a signal of the same frequency as the resonant frequency of the cavity. The output of the mixer is a difference harmonic between the resonant frequency and the predetermined reference frequency with the difference frequency being related to changes in the density of the fluid contained within the low loss portion of the conduit and encircled by the cavity.

9 Claims, 4 Drawing Figures

PATENTED AUG 29 1972

INVENTORS
ALOYSIUS BAK
ROY E. RESH
BY Plante, Hartz, Smith
& Thompson
ATTORNEYS

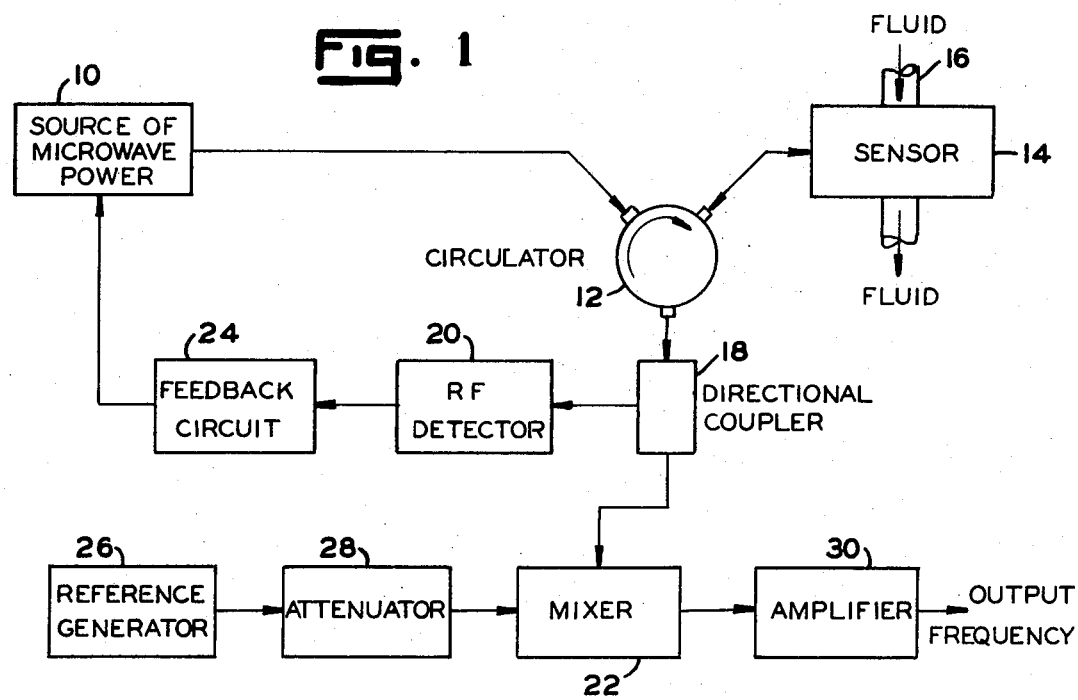
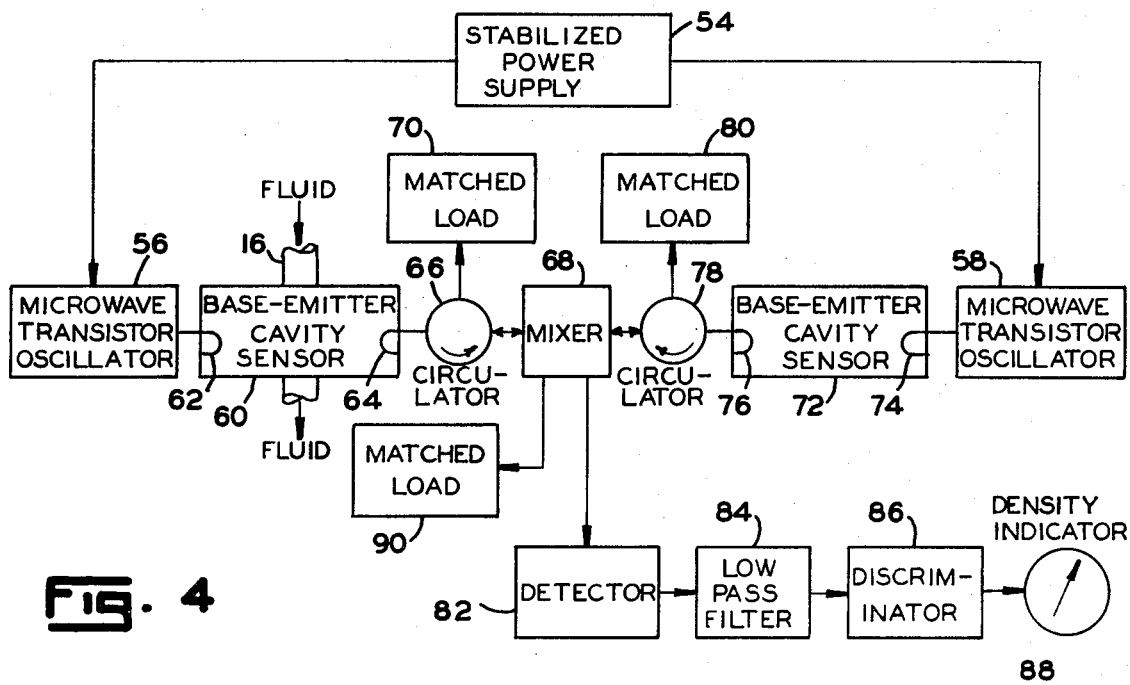

MEANS FOR MEASURING THE DENSITY OF FLUID IN A CONDUIT

BACKGROUND OF THE INVENTION

Prior to the invention, many different types of systems have been designed to measure the density of a fluid within a conduit. One type of densitometer for measuring fluid contained within a conduit uses an electromagnetic field radiated through the conduit. Certain types of fluid that were sensitive to an electromagnetic field would react in certain ways and these reactions, which could be sensed by a magnetic pickup, were directly related to the density of the fluid within the conduit. However, the major limitation of the densitometer of the electromagnetic type resides in the fact only fluids that are sensitive to electromagnetic fields can be measured to determine the density thereof.

Another typical system for measuring the density of a fluid within a conduit resides in the use of a flow restrictive orifice and measuring the pressure differential thereacross. The pressure differential will be related to, though not solely, the density of the fluid flowing within the conduit. Problems with using the flow restrictive orifice type of densitometer reside in the fact that additional power will be required to maintain a given flow rate due to the restrictive element. Also, the function between the pressure differential across the restrictive orifice and changes in the density of the fluid flowing therethrough cannot be very accurate because of other parameters involved.

Still another example of a typical densitometer is a vane type flowmeter. The rotation of the vanes, or relative motion with respect to a restraining element, will be dependent upon the mass of the fluid flowing through the meter. Again, however, the vane type flowmeter must interfere with the unrestricted flow of the fluid. This type of densitometer would require additional power to maintain a given flow rate. All of the previously mentioned densitometers, except certain types of electromagnetic densitometers, would require the fluid to be flowing within the conduit. The present invention does not have such a requirement.

A type of densitometer that is more closely related to the present invention, though still being substantially different in many aspects, is shown in NASA Technical Note D—3514 therein describing the use of an open-ended circular microwave cavity for operating at resonant conditions. The cavity, which is resonated by an independent source of microwave energy, will be maintained at resonant conditions with the resonant frequency being dependent upon the fluid contained within the cavity. However, as discussed in the previously mentioned technical note, the distance between the ends of the conduit within the microwave cavity becomes a critical factor. Also, the flow of the fluid from the conduit into the cavity creates a disturbance in the fluid flow thereby again requiring additional energy to maintain a relatively constant flow rate.

BRIEF DESCRIPTION OF THE DRAWINGS

FIG. 1 is a pictorial block diagram of a system for measuring the density of a fluid within a conduit using a closed end resonant cavity.

FIG. 4 is an alternate embodiment of FIG. 1.

DESCRIPTION OF THE PREFERRED EMBODIMENT

Figure 2:
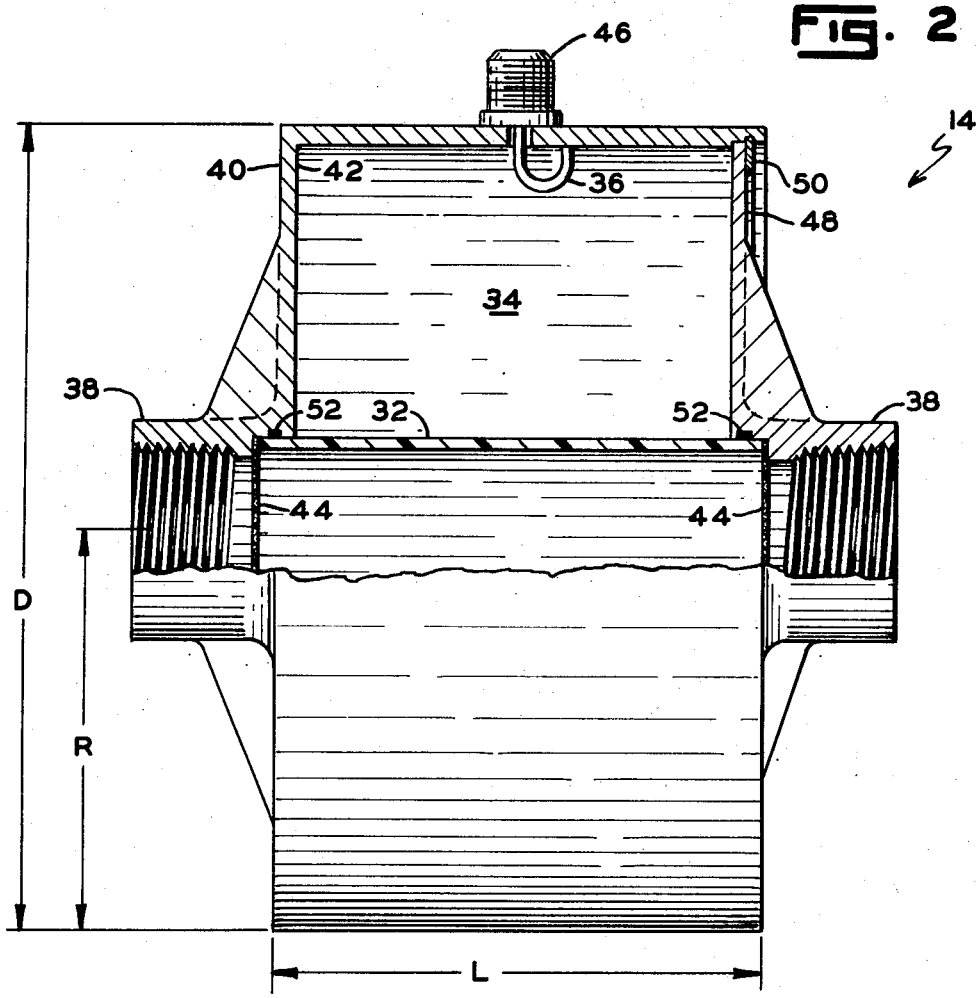
FIG. 2 is a partial section side view of the sensor shown in FIG. 1.

Referring now to FIG. 1, a source of microwave power is generated. Many ways of generating microwave power are known to those skilled in the art. One typical method would be to use a solid state radio frequency oscillator. The frequency of the oscillator could be controlled by a feedback signal as will be subsequently described. The typical frequency of operation of the source of microwave power 10 would be around 1.8 gigahertz. The output of the source of microwave power 10 feeds into circulator 12 which is a conventional type known to those skilled in the art. The circular 12 delivers substantially all of the power from the microwave power source 10 to a sensor 14 which has a resonant cavity that surrounds conduit 16. Within conduit 16 a fluid may be flowing, or the fluid may be in stationary position within sensor 14 and conduit 16.

If the frequency of the power delivered from the microwave source 10 to the sensor 14 is equal to the resonant frequency of the cavity for sensor 14, then the cavity will absorb essentially all the energy delivered by the microwave power source 10 through circulator 12 to the sensor 14. However, if the frequency delivered to sensor 14 is not as equal to one of the fundamental resonant modes of the cavity, than a portion of the signal, greater than the very small signal being reflected when operating in a resonant mode, will be reflected back to circulator 12. The particular type of fundamental mode and the details of the sensor 14 will be subsequently described in greater detail. The reflected signal in circulator 12 feeds to directional coupler 18 with the part of the reflected signal going to radio frequency detector 20 and the remainder to microwave mixer 22.

The radio frequency detector 20, which may be of the crystal type, will sense the reflected signal from sensor 14 through circulator 12 and directional coupler 18. The output of the radio frequency detector 20, which is normally a DC voltage with superimposed AC voltage, feeds into feedback circuit 24. The feedback circuit 24, in conjunction with the radio frequency detector 20, determines the amount of bias control needed by the source of microwave power 10 to change the output frequency to a frequency equal to the resonant frequency of the cavity in sensor 14. Therefore, the feedback circuit 24 continuously drives the microwave power source 10 to a null position by continuously changing the bias as the resonant frequency of sensor 14 is changed. Hence, if the fluid flowing through, or contained in, conduit 16 and sensor 14 has changed in density, the resonant condition of the cavity in sensor 14 will also change. This change in resonant condition will be sensed by radio frequency detector 20 and the bias of the source of microwave power 10 will be changed by feedback circuit 24. Therefore, the frequency output of the source of microwave power 10 will be changed to maintain the cavity of sensor 14 at its new resonant condition. It should be understood that a signal will be continuously available in the directional coupler 18 even though the amplitude of the signal will be of a minimum value when the sensor 14 is maintained at resonant condition.

The output of the directional coupler 18 is combined in mixer 22 with the output signal of reference generator 26 which is maintained at a frequency near the frequency of the source of microwave power 10. For ease of operation, reference generator 26 may have a reference frequency immediately above the maximum frequency of the source of microwave power 10, or a reference frequency immediately below the minimum frequency of the source of microwave power 10, to eliminate the need for calculation of the sign component. Since the amplitude of the signal from the reference generator 26 is probably much larger than the amplitude of the signal from directional coupler 18, an attenuator 28 may be necessary to reduce the signal amplitude. It would be just as feasible to amplify the signal from the directional coupler 18 and eliminate the need for attenuator 28. The method of implementation depends upon a personal choice and economic considerations when dealing with higher voltage components. The output of the mixer 22 is fed into amplifier 30 which filters and conditions the mixed frequencies to give an output equal to one of the difference harmonics. The most logical choice of the difference harmonics would be the fundamental difference frequency where the smaller frequency is subtracted from the larger frequency to give a difference output frequency Since the frequency of the microwave power source 10 is dependent upon the density of the fluid within conduit 16, the difference output frequency from amplifier 30 is also dependent upon the density of the fluid in conduit 16. This difference output frequency may be converted by any convenien to give a direct visual or computer indication of the fluid density. If the volume of fluid flowing through the sensor is known, mass flow as used in various missile systems can be accurately calculated.

Figure 3:
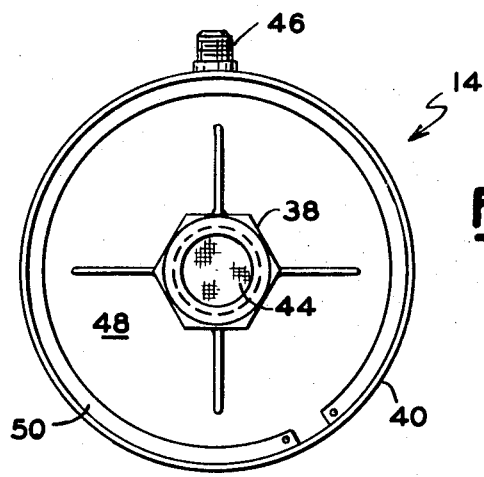
FIG. 3 is a reduced size, end view of the sensor shown in FIG. 2.

In the present invention the microwave densitometer for use in a stationary or flowing fluid system comprises the flow density sensor 14 and the associated electronics. The sensor 14 will be installed in the flow line of conduit 16. Referring to FIGS. 2 and 3 in combination, a fiberglass pipe section 32 of the sensor 14 is surrounded by a circular cavity 34 whose dimensions are selected to sustain only one resonant mode. In the frequency range of interest, the most logical choice would be the $TM_{010}$ mode. TM means transverse magnetic waves whose magnetic field factor is entirely in a plane transverse to the axis of propagation. Only the electric field has a component in the direction of propagation. Hence, in the $TM_{010}$ mode the electric field is uniform when taking a perpendicular cross section of the cavity. For further discussion of transverse magnetic waves reference is made to PRINCIPLES AND APPLICATIONS OF ELECTROMAGNETIC FIELDS by Plonfvy and Collin, McGraw Hill Book Company, Inc. 1961. A cavity 34 is excited by specially shaped probe (RF antenna) 36 which insures the excitation of the $TM_{010}$ mode. The sensor 14, as can be seen in FIGS. 2 and 3, is essentially a circular cavity with a column of fluid forming a concentric dielectric rod. The fiberglass pipe section 32 is only heavy enough to constrain the flow of the fluid without effecting the electrical condition in the sensor 14. The fiberglass pipe section 32 can also be fabricated from other dielectric materials such as fused quartz. The fiberglass pipe section 32 and fittings 38 should withstand fairly large operating pressure over a wide temperature range. Typical examples would be 120 psi. over temperature range of −54° C up to 230° C. The frequency variations due to density changes of the fluid will be less than ten percent.

Going into more detail with respect to the sensor 14, the cavity 34 is formed by a housing 40 which has been fabricated from aluminum with silver plating 42 inside. The silver plating 42 must be low loss and have a good surface finish. Gold or copper could be used as the plating, but copper has the problem of tarnishing and gold is too expensive.

As a further means of insuring that the $TM_{010}$ mode is dominant, the ratio of length L to radius R of the sensor 14 must be less than 2. The cavity diameter D should be selected in conjunction with the operating frequency in such a manner to prevent propagation of the radio frequency energy down the conduit 16.

As a size of the conduit 16 and the fiberglass pipe section 32 increases, maintaining a uniform electric field across the fiberglass pipe section 32 becomes a problem. Even though fiberglass or fused quartz has a low loss tangient with respect to the microwave energy radiated by antenna 36, the fluid at the center of the fiberglass section 32 will have a lower electric field than the fluid at the edge of fiberglass section 32. To help maintain the uniform electric field across the fluid within fiberglass section 32, a screen 44 is inserted at each end of fiberglass section 32. The screen 44 is selected so that it will help maintain uniform electric field and, at the same time, have a minimum resistance to fluid flow.

Further describing one possible construction of the sensor 14, the microwave power source 10 is coupled into the cavity by the means of antenna 36, which may be of the standard "N" type, with one end connected to the center conductor or radio frequency connector 46, and the other end connected to the silver plating 42. The position along the length L of the connector 46 is not critical because the electromagnetic field quantities of the $TM_{010}$ mode are independent of the longitudinal coordinate in the cavity 34.

The conditions within the cavity 34 must be maintained relatively constant. Therefore, end section 48 must fit fairly tight against housing 40. Though not shown, a seal may be necessary when the end section 48 is retained by retaining ring 50. A seal 52 is included between fiberglass section 32 and fitting 38 to insure that none of the fluid will enter cavity 34.

As the temperature of the fluid in conduit 16 varies, the density of the fluid, as well as the dielectric constant, will also vary. The variation in the dielectric constant will affect the resonant condition of the cavity 34. Because of the rod-like appearance of the fluid contained within fiberglass section 32, variations in the frequency of microwave energy from the microwave power source 10 are necessary so that the resonant condition in the cavity 34 can be maintained. The use of $TM_{010}$ mode rather than other modes permits the modulation and detection of the resonant condition with a single rigid antenna mounted at a fixed location with antenna 36 being a typical example. It should be understood by those skilled in the art that the performance of the system depends upon the capability of the signal processing circuitry to follow the resonant frequency of the cavity 34, and to accurately measure such frequency with the fundamental difference output frequency from amplifier 30 being a typical frequency that can be used.

A convenient means of utilizing the present invention, though not specifically shown in the drawings, would be to make the housing 40 and the end section 48 into two halves as if the sensor 14 had been cut along its longitudinal axis. Therefore, if a loss section such as section 32 is included within conduit 16 or any other similar conduit, then the sensor could be clamped over the low loss section by any suitable means such as bolts, clamps, etc., and the density of the fluid flowing through the conduit could be measured. By utilizing this means, the flow of the fluid through the conduit would not be interrupted and the same equipment could be used to measure the density of the fluid flowing in a number of different conduits. As another possibility, the electronics used to control sensor 14 could be time shared by the appropriate computer means with other sensors so that the density of the fluid in a number of conduits can be continuously sampled by a computer. In today's space flight, the mass flow rate is essential and the continuous monitoring or sampling by computer would be a very desirable feature.

It should be obvious to a person skilled in the art that many other innovations other than the previously mentioned ideas may be included that incorporate the essence of the applicant's invention. FIG. 4 shows an alternate embodiment of the applicant's invention with two sensors being used to eliminate the need for a reference generator and, simultaneously, providing variations in a reference sensor that essentially correspond to variations in a measuring sensor except for fluid density changes. A stabilized power supply 54 is used to supply energy to two identical microwave transistor oscillators 56 and 58. The microwave transistor oscillator 56 uses the cavity of sensor 60 as a resonator in generating the resonant frequency by utilizing a base-emitter coupling through antenna 62. The resonant frequency generated in base-emitter cavity sensor 60 is dependent upon the density of fluid flowing through conduit 16 as previously described. Antenna 64 couples the frequency in sensor 60 to circulator 66 and, thereafter, to mixer 68. Any possible reflected signal from mixer 68 will be attenuated to essentially zero in matched load 70.

The reference generator 26 as described in conjunction with FIG. 1 has been replaced in FIG. 4 by the microwave transistor oscillator 58 and a sensor 72 that is identical to sensor 60 except no fluid is flowing through or contained in sensor 72. However, sensor 72 is positioned so that any environmental changes, such as temperature, acting upon sensor 60 will also act upon sensor 72. The fluid is the only environment element not common to both sensors 60 and 72. Hence, any difference in fundamental resonant frequency of the two sensors 60 and 72 should be directly related to the density of the fluid. Therefore, with antennas 74 and 76, circulator 78, and matched load 80 being identical to antennas 62 and 64, circulator 66, and matched load 70, respectively, the mixer 68 should receive signals that have corresponding frequency variations for all parameters except fluid density. If the difference frequency is used, these corresponding variations will cancel leaving a variation proportional to density change.

A detector 82 receives the signals from circulators 66 and 78 after being combined in mixer 68. Low pass filter 84 will only allow the fundamental difference frequency to pass to discriminator 86. The discriminator 86 changes the difference frequency to a voltage that can be used by density indicator 88, or any other monitoring means that may be used. To help prevent unwanted reflected signals, a matched load 90 is also included for mixer 68. A typical value for the matched loads 70, 80 and 90 would be 50 ohms. Since detector 82 cannot recognize a sign variation, the reference sensor 72 should be set at frequency immediately above the maximum frequency of sensor 60 or below the minimum frequency of sensor 60. Normally the presence of fluid in sensor 60 will provide this setting, but a fine tuning of the microwave transistor oscillators 56 and/or 58 may be used for added assurance.

Because the microwave transistor oscillators 56 and 58 use their respective cavities for generating the resonant frequency, two antennas are necessary. If the frequencies were being generated independently of the cavities, one antenna could be used with the signals being fed in where the matched loads 70 and 80 are connected.

We claim:

1. A means for detecting density of a fluid in a conduit, said density detecting means comprising:

fluid sensor means having a resonant cavity about a section of said conduit containing said fluid, said section having low loss when exposed to said high frequency energy;

a first microwave transistor oscillator connected to said resonant cavity for generating a source of high frequency energy;

means associated with said first microwave transistor oscillator for changing the frequency of said source as the resonant frequency of said cavity changes due to changing density of said fluid in said low loss section of said conduit;

reference generator means for generating a reference frequency relatively close to the frequency of said high frequency energy;

said reference generator means having reference sensor means identical to said fluid sensor means and a second microwave transistor oscillator identical to said first microwave transistor oscillator, said second microwave transistor oscillator utilizing the cavity of said reference sensor means to generate said reference frequency; and means for comparing said reference frequency with said high frequency energy to give an output frequency equal to a difference harmonic between said frequencies, said output frequency being proportional to the density of said fluid in said low loss section of said conduit.

2. The density detecting means, as recited in claim 1, wherein said reference frequency is a frequency immediately outside the range of said resonant frequency so that the output frequency never reaches zero.

3. The density detecting means, as recited in claim 2, wherein said cavity is of a cylindrical type with said cavity being resonated in the first mode to produce a uniform electric field perpendicular to the axis of said cylinder.

4. The density detecting means, as recited in claim 3, wherein said low loss section of said conduit is concentric about the axis of said cylinder to appear as a column of fluid contained within said cavity.

5. The density detecting means, as recited in claim 4, wherein said sensor means includes an antenna means located in the side of said cylinder for radiating said high frequency energy.

6. The density detecting means, as recited in claim 3, wherein said fluid sensor means includes a screen means to help maintain said uniform electric field within said fluid.

7. The density detector means, as recited in claim 1, wherein said reference sensor means is physically located near said fluid sensor means with the only variable that does not effect both sensors being the fluid contained in said fluid sensor means.

8. The density detector means, as recited in claim 7, wherein the resonant frequencies of the cavities of said fluid sensor means and said reference sensor means are combined in a mixer and filtered to obtain said difference harmonic.

9. The density detector means, as recited in claim 8, wherein:

said fluid sensor means and said reference sensor means have two antennas each, the first antennas being used to resonate the respective cavities and the second antennas being used to detect the resonant frequency of the respective cavities;

said density detector means further includes circulators between detecting antennas and said mixer, said circulators having matched loads to prevent feedback from said mixer to said detecting antennas.

* * * * *